(12) United States Patent
Margerm et al.

(10) Patent No.: US 9,191,682 B2
(45) Date of Patent: *Nov. 17, 2015

(54) VIDEO CODECS WITH INTEGRATED GAMUT MANAGEMENT

(71) Applicant: Dolby Laboratories Licensing Corporation, San Francisco, CA (US)

(72) Inventors: Steve Margerm, New Westminster (CA); Peter W. Longhurst, Vancouver (CA); Robin Atkins, Campbell, CA (US); Anders Ballestad, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,354

(22) Filed: Dec. 5, 2014

(65) Prior Publication Data

US 2015/0085925 A1 Mar. 26, 2015

Related U.S. Application Data

(63) Continuation of application No. 13/707,114, filed on Dec. 6, 2012, now Pat. No. 8,934,726.

(60) Provisional application No. 61/577,636, filed on Dec. 19, 2011.

(51) Int. Cl.
*G06K 9/72* (2006.01)
*H04N 19/60* (2014.01)
(Continued)

(52) U.S. Cl.
CPC .............. *H04N 19/60* (2014.11); *H04N 7/30* (2013.01); *H04N 19/117* (2014.11); *H04N 19/124* (2014.11); *H04N 19/154* (2014.11);

*H04N 19/182* (2014.11); *H04N 19/186* (2014.11); *H04N 19/44* (2014.11); *H04N 19/51* (2014.11); *H04N 1/6058* (2013.01);
(Continued)

(58) Field of Classification Search
None
See application file for complete search history.

(56) References Cited

U.S. PATENT DOCUMENTS

| 5,706,290 A | 1/1998 | Shaw |
| 5,786,855 A | 7/1998 | Chen |

(Continued)

FOREIGN PATENT DOCUMENTS

| EP | 0112499 | 7/1984 |
| EP | 1871113 | 12/2007 |

(Continued)

OTHER PUBLICATIONS

Mantiuk, R.; Krawczyk, G.; Myszkowski, K.; Seidel, H. -P, "High Dynamic Range Image and Video Compression—Fidelity Matching Human Visual Performance," Image Processing, 2007. ICIP 2007. IEEE International Conference on, vol. 1, No., pp. I-9,1-12, Sep. 16, 2007-Oct. 19, 2007.*

(Continued)

*Primary Examiner* — Andrae S Allison

(57) ABSTRACT

Image decoders encoders and transcoders incorporate gamut transformations. The gamut transformations alter tone, color or other characteristics of image data. The gamut transformations may comprise interpolation, extrapolation, direct mapping of pixel values and/or modification of an expansion function. Gamut transformations may be applied to generate image output (video or still) adapted for display on a target display.

14 Claims, 12 Drawing Sheets

(51) Int. Cl.

| | |
|---|---|
| *H04N 19/117* | (2014.01) |
| *H04N 19/186* | (2014.01) |
| *H04N 19/154* | (2014.01) |
| *H04N 19/44* | (2014.01) |
| *H04N 19/124* | (2014.01) |
| *H04N 19/182* | (2014.01) |
| *H04N 19/51* | (2014.01) |
| *H04N 1/60* | (2006.01) |
| *H04N 19/176* | (2014.01) |
| *H04N 19/48* | (2014.01) |
| *H04N 19/86* | (2014.01) |

(52) U.S. Cl.
CPC ............. *H04N 19/176* (2014.11); *H04N 19/48* (2014.11); *H04N 19/86* (2014.11)

(56) References Cited

U.S. PATENT DOCUMENTS

| | | | |
|---|---|---|---|
| 5,930,387 A | 7/1999 | Chan | |
| 6,104,863 A | 8/2000 | Strolle | |
| 6,477,318 B2 | 11/2002 | Ishii | |
| 6,633,668 B1 * | 10/2003 | Newman | 382/166 |
| 6,640,005 B1 * | 10/2003 | Westerman et al. | 382/166 |
| 6,891,892 B2 | 5/2005 | Yang | |
| 7,046,252 B2 | 5/2006 | Nair | |
| 7,106,910 B2 * | 9/2006 | Acharya et al. | 382/240 |
| 7,251,358 B2 | 7/2007 | Haikin | |
| 7,352,410 B2 | 4/2008 | Chou | |
| 7,646,817 B2 | 1/2010 | Shen | |
| 7,657,088 B2 * | 2/2010 | Kim et al. | 382/167 |
| 7,750,919 B2 | 7/2010 | Bang | |
| 8,014,445 B2 * | 9/2011 | Segall et al. | 375/240.01 |
| 8,396,122 B1 * | 3/2013 | Taylor | 375/240.12 |
| 2005/0213125 A1 | 9/2005 | Smith | |
| 2006/0013308 A1 | 1/2006 | Kim | |
| 2007/0159556 A1 | 7/2007 | Yang | |
| 2007/0201560 A1 * | 8/2007 | Segall et al. | 375/240.24 |
| 2007/0286523 A1 | 12/2007 | Kim | |
| 2007/0291179 A1 | 12/2007 | Sterling | |
| 2008/0031518 A1 | 2/2008 | Song | |
| 2008/0266314 A1 | 10/2008 | Butterworth | |
| 2009/0034864 A1 | 2/2009 | Kisilev | |
| 2009/0109233 A1 | 4/2009 | Kerofsky | |
| 2009/0161009 A1 | 6/2009 | Glen | |
| 2009/0168894 A1 | 7/2009 | Marpe | |
| 2009/0196352 A1 | 8/2009 | Stein | |
| 2009/0285283 A1 | 11/2009 | Gao | |
| 2010/0008427 A1 | 1/2010 | Chiu | |
| 2010/0054581 A1 * | 3/2010 | Bala et al. | 382/162 |
| 2010/0073362 A1 | 3/2010 | Ikizyan | |
| 2010/0088736 A1 | 4/2010 | Besen | |
| 2010/0091840 A1 | 4/2010 | Gao | |
| 2010/0128786 A1 | 5/2010 | Gao | |
| 2010/0178035 A1 | 7/2010 | Xie | |
| 2010/0272185 A1 | 10/2010 | Gao | |
| 2011/0013700 A1 | 1/2011 | Kim | |
| 2011/0188577 A1 * | 8/2011 | Kishore et al. | 375/240.16 |

FOREIGN PATENT DOCUMENTS

| | | |
|---|---|---|
| EP | 2259580 | 12/2010 |
| JP | 2000023193 | 1/2000 |
| KR | 20080020314 | 3/2008 |
| WO | 2005/104035 | 11/2005 |
| WO | 2006/093383 | 9/2006 |
| WO | 2007/026304 | 3/2007 |
| WO | 2008/026896 | 3/2008 |
| WO | 2010/074407 | 7/2010 |
| WO | 2010/106100 | 9/2010 |
| WO | 2010/104624 | 10/2010 |
| WO | 2011/106247 | 9/2011 |
| WO | 2012/012489 | 1/2012 |

OTHER PUBLICATIONS

Preiss, Jens, et al. "Gamut mapping in a high-dynamic-range color space." IS&T/SPIE Electronic Imaging. International Society for Optics and Photonics, 2014.*

T. Wiegand, GJ Sullivan, G. Bjntegaard, and A. Luthra, "Overview of the H.264/AVC video coding standard," Circuits and Systems for Video Technology, IEEE Trans. on, vol. 13, No. 7, pp. 560-576, 2003.*

Mantiuk, R. "Backward Compatible High Dynamic Range MPEG Video Compression" Jul. 2006, ACM Transactions on Graphics, vol. 25, No. 3, pp. 713-23.

Mateos, J. et al., "High-Resolution Color Image Reconstruction from Compressed Video Sequences" Sep. 4-8, 2000, Signal Processing X Theories and Applications Proceedings of EUSIPCO 2000, Tenth European Signal Processing Conference.

Song, B. C., et al. "Block Adaptive Inter-Color Compensation Algorithm for RGB 4:4:4 Video Coding" IEEE Transactions on Circuits and Systems for Video Technology, vol. 18, No. 10, Oct. 2008.

Marpe, D. et al., "Macroblock-Adaptive Residual Color Space Transforms for 4:4:4 Video Coding" 2006 International Conference on Image Processing, Oct. 8-11, 2006.

Sullivan, G. et al., "New Standardized Extensions of MPEG4-AVC/H.264 for Professional-Quality Video Applications" Proc. 2007 IEEE International Conference on Image Processing, ICIP 2007, p. I-13-16.

Xiangwen, D. et al. "4D-MDCT Based Adaptive Prediction and Compensation Color Video Coding" 2004 7th International Conference on Signal Processing Proceedings, Aug.-Sep. 2004, p. 1131-4, vol. 2.

Jongmyon, Kim, "Architectural Enhancements for Color Image and Video Processing on Embedded Systems" 2005, vol. 6603B of Dissertations Abstracts International, p. 1627-173 pages.

Schiller, H. et al., "Investigations on Colour Coding in an Object-Oriented Analysis-Synthesis Coder" 2011 Elsevier Eng. Info. Inc.

Hontsch, I. et al., "Locally Adaptive Perceptual Image Coding" IEEE Transactions vol. 9 Issue 9 pages, 1472-1483, 2000.

Winken, M. et al. "Bit-Depth Scalable Video Coding" IEEE Intl Conference on Image Processing 2007.

Ward, G. et al. "Subband Encoding of High Dynamic Range Imagery" ACM Int'l Conf. Proc. Series, vol. 73, pp. 83-90, 2004.

* cited by examiner

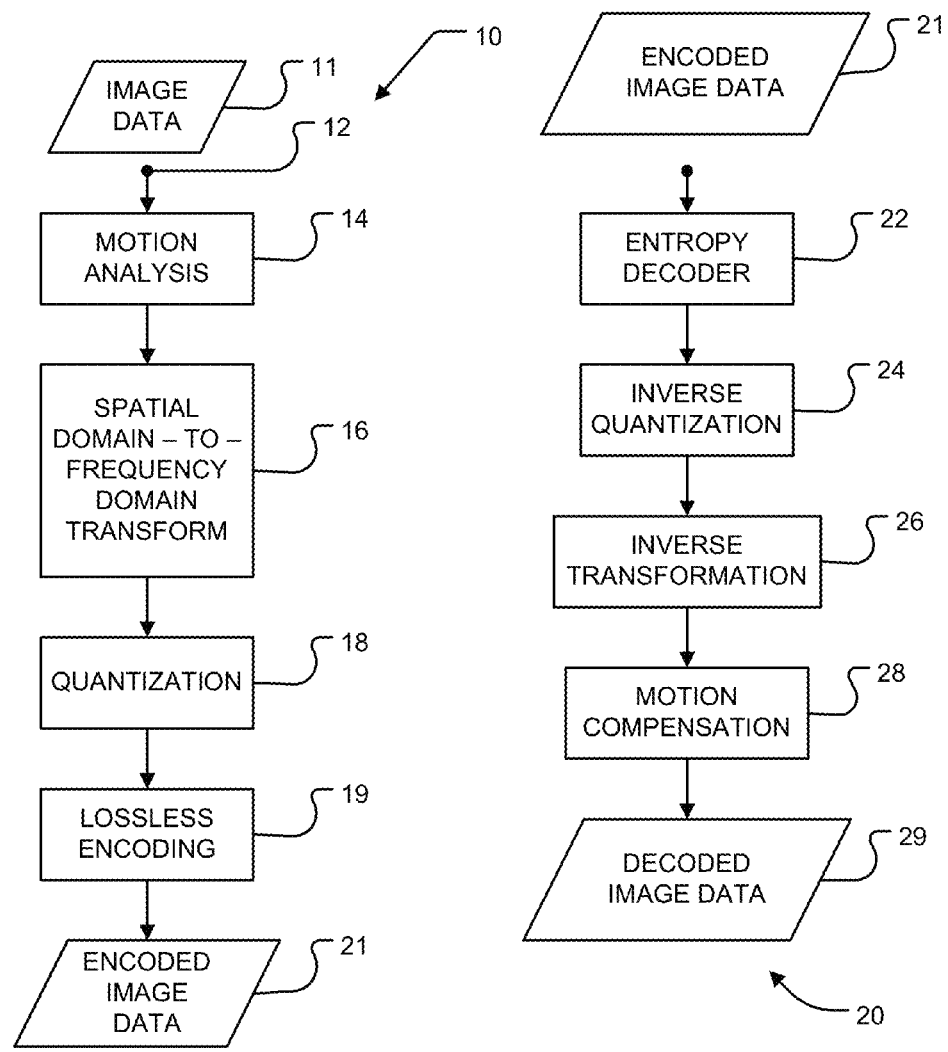

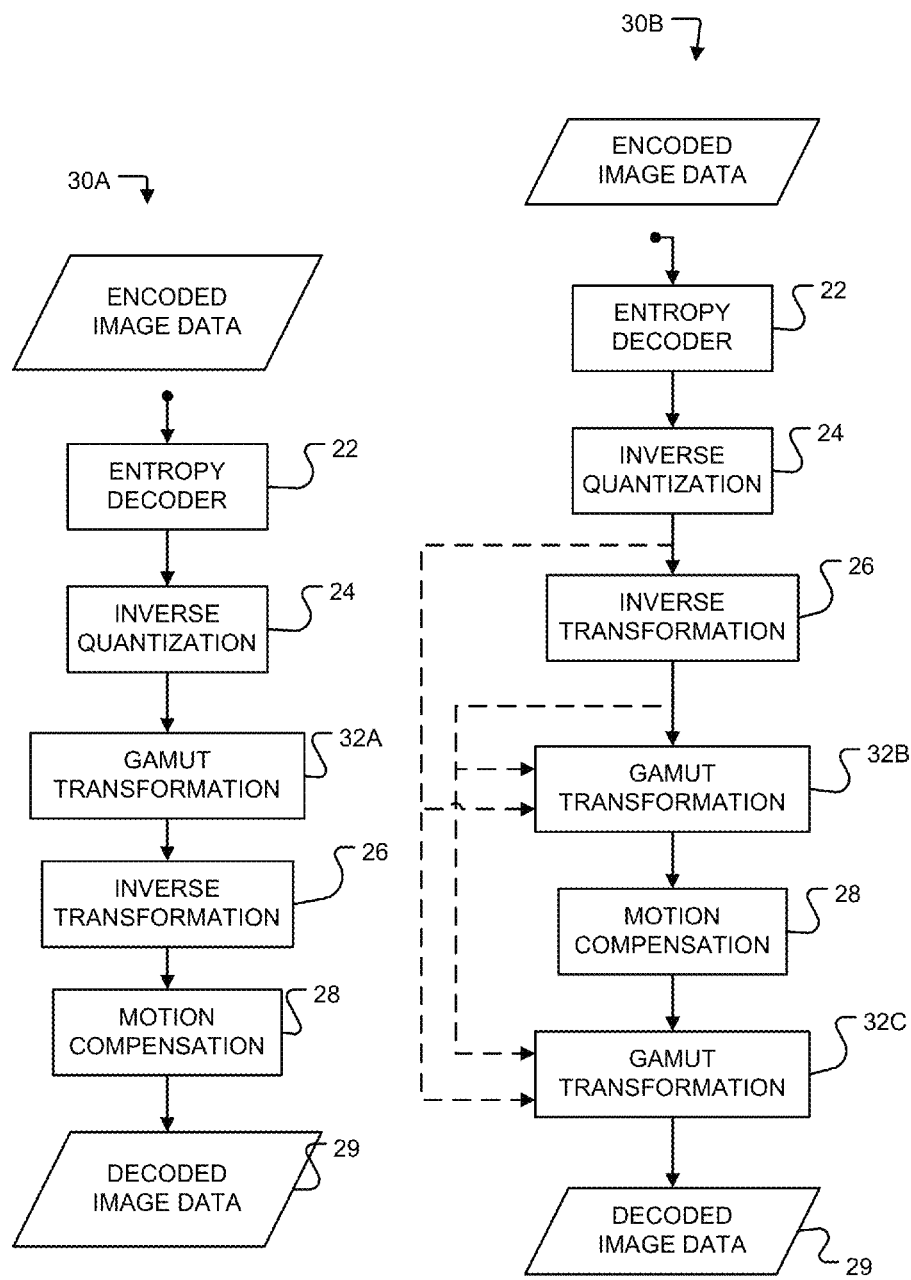
FIGURE 3A                    FIGURE 3B

VIDEO CODECS WITH INTEGRATED GAMUT MANAGEMENT

CROSS REFERENCE TO RELATED APPLICATIONS

This application is a continuation application of U.S. non provisional patent application Ser. No. 13/707,114 filed on 6 Dec. 2012, which claims the benefit of priority to Provisional U.S. Patent Application No. 61/577,636 filed on 19 Dec. 2011 entitled "Video Codecs With Integrated Gamut Management" by Steve Margerm, et al, hereby incorporated by reference in its entirety.

TECHNICAL FIELD

The invention relates to displaying and processing images. The invention has particular application to applying gamut mapping to pixel values in images in conjunction with encoding and/or decoding and/or transcoding the images. The gamut mapping may comprise applying transformations that affect color (chromaticity), luminance (tone) or both.

BACKGROUND

Displays such as televisions, computer monitors, displays in portable devices, digital cinema displays, special purpose displays such as virtual reality displays, vehicle simulators, advertising displays, medical imaging displays, stadium displays, and the like are widespread.

A wide range of display technologies are now available. For example, there are plasma displays, LCD displays backlit by a variety of types of light sources such as LEDs of various types, fluorescent lamps, high-intensity incandescent lamps, or combinations of these, CRT-based displays, digital mirror displays, digital cinema displays, OLED displays etc. Individual displays combine display hardware with video signal processing components that receive video signals and drive display hardware to display video content of the video signals.

Different displays may vary significantly with respect to features such as:
  the color gamut that can be reproduced by the display;
  the maximum brightness achievable;
  image processing performed on signals to be displayed;
  contrast ratio;
  resolution;
  acceptable input signal formats;
  color depth;
  white level;
  black level;
  white point;
  grey steps;
  etc.

The appearance of images displayed on a display is also affected by ambient lighting conditions. Video or other images presented under theater conditions (low ambient lighting) may be perceived by viewers significantly differently than the same video or other images would be perceived when viewed under conditions with significant ambient light. Further, the characteristics (such as the color temperature, direction of incidence etc.) of ambient light can affect a viewer's perception of displayed image content.

The creator of a video production or other image may set tones and colors of pixels in the image with the intention that, when viewed, the image has a desired appearance which agrees with the creator's creative intent. For example, a creator may wish some scenes to have a darker, more oppressive, feel than others. The creator may wish certain features depicted in a scene to stand out or to be less prominent. The creator may wish to have colors seem extra vivid in some scenes and more muted in others. Adjusting tones and colors of pixels in an image may include performing color grading (or 'color timing') on the source video data. Color grading may be performed using a hardware/software system that permits a user to change the video data in various ways to achieve a desired appearance.

Because displays can perform very differently, the same image content may appear different when viewed on different displays. Image content that has a desired appearance when viewed on one display may have a less-desirable appearance when viewed on another display having different capabilities. A creator of an image may desire that the image have an appearance, when displayed, that matches the creator's creative intent. Image content that matches a creator's creative intent when displayed on some displays may depart from the creator's creative intent in one or more ways when viewed on other displays.

There is a need for convenient ways to modify image data for display on different target displays.

SUMMARY

This invention has a number of aspects. These include, without limitation: methods for encoding and/or decoding and/or transcoding image data which integrate gamut mapping; and video data encoders, decoders and transcoders that integrate gamut mapping.

One example aspect of the invention provides an image decoder. The image decoder comprises a motion compensation stage and a gamut transformation unit upstream from the motion compensation stage. The gamut transformation unit is configured to modify pixel values in image data being decoded. In some embodiments the gamut transformation unit is provided by hardware separate from that of the motion compensation stage. In other embodiments the gamut transformation unit and motion compensation stage are provided by integrated hardware. In either case, the hardware may comprise programmable hardware in combination with suitable software instructions and/or non-programmable hardware.

In some embodiments the image decoder comprises a frequency domain to spatial domain converter and the gamut transformation unit is configured to modify pixel values in macroblocks output by the frequency domain to spatial domain converter.

In some embodiments the image decoder comprises an inverse quantization stage upstream from the frequency domain to spatial domain converter and the gamut transformation unit is connected to receive data output by the inverse quantization stage and is configured to control a gamut transformation based at least in part on values for DC frequency coefficients included in the data output by the inverse quantization stage.

In some embodiments the image decoder comprises first and second parallel decoding pipelines upstream from the motion compensation stage and the gamut transformation unit is configured to interpolate between or extrapolate from values in corresponding macroblocks respectively output by the first and second parallel decoding pipelines.

Another aspect of the invention provides a method for decoding images. The method comprises processing an encoded signal to yield macroblocks; processing the macroblocks for motion compensation to yield output image data;

and, upstream from processing the macroblocks for motion compensation, modifying pixel values in the macroblocks. Modifying the pixel values may comprise applying a gamut transformation. The gamut transformation may have the effect of altering tones and/or chromaticity values in decoded image data. The images may comprise still images or video images.

In some embodiments, processing the encoded signal comprises performing a frequency domain to spatial domain transformation and modifying the pixel values is performed in the spatial domain.

Some embodiments comprise performing an inverse quantization operation upstream from performing the frequency domain to spatial domain transformation and modifying the pixel values in the macroblocks is performed in a transformation based at least in part on values for DC frequency coefficients included in the data yielded by the inverse quantization operation.

In some embodiments, modifying pixel values in the macroblocks comprises modifying values in frequency domain macroblocks.

Methods according to some example embodiments comprise processing first and second data in parallel decoding pipelines upstream from processing the macroblocks for motion compensation and modifying pixel values in the macroblocks comprises interpolating between or extrapolating from values in corresponding macroblocks respectively output by the first and second parallel decoding pipelines.

In addition to the example aspects and embodiments described above, further aspects and features of example embodiments are illustrated in the accompanying drawings and/or described in the following description.

BRIEF DESCRIPTION OF THE DRAWINGS

Non-limiting example embodiments are illustrated in the appended drawings. The embodiments and figures disclosed herein are to be considered illustrative rather than restrictive.

FIG. 1 is a block diagram illustrating an example video encoder.

FIG. 2 is a block diagram illustrating an example video decoder.

FIGS. 3A and 3B are block diagrams illustrating decoders according to alternative example embodiments.

DESCRIPTION

Figure 3:
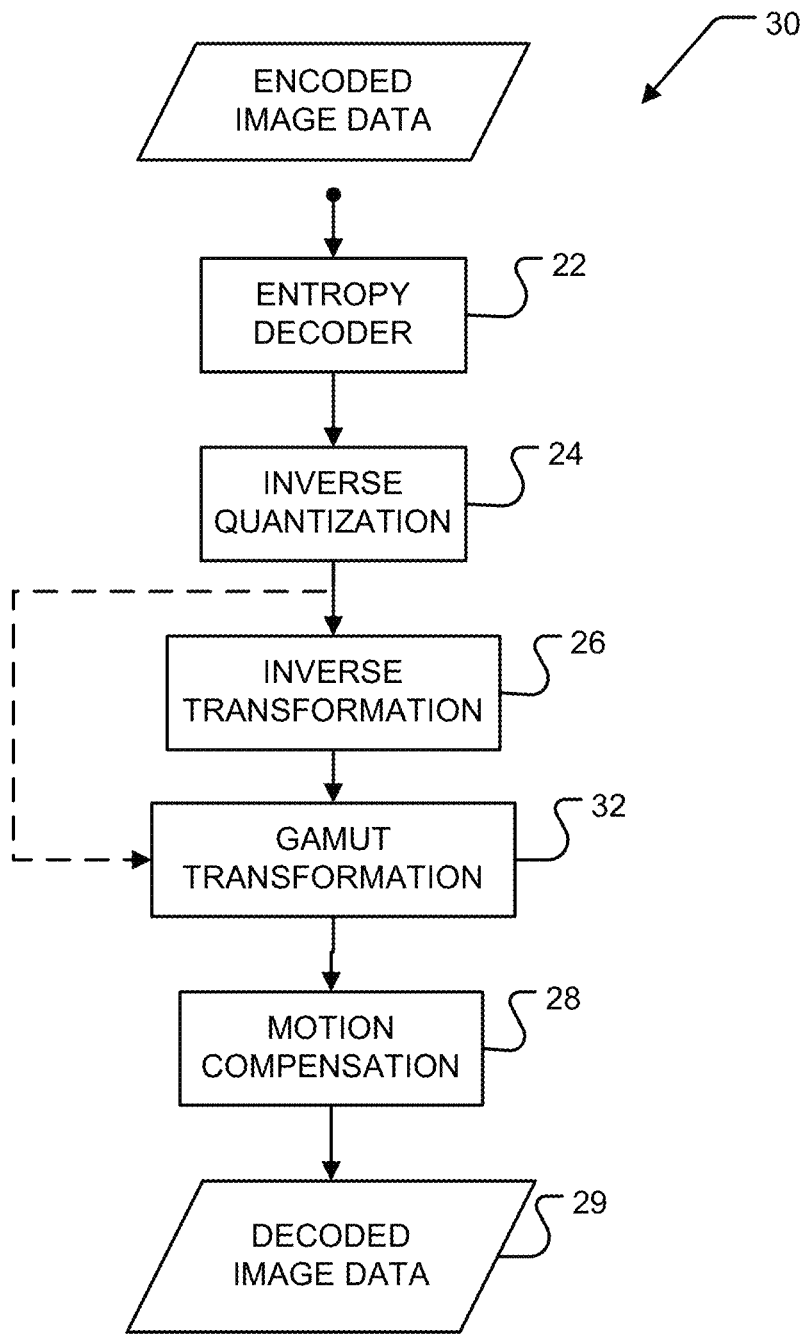
FIG. 3 is a block diagram illustrating a decoder according to a simple example embodiment.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Gamut mapping may be performed on image data to adapt the image data for display on a particular target display. U.S. patent application No. 61/307,547 filed on 24 Feb. 2010 and entitled DISPLAY MANAGEMENT METHODS AND APPARATUS and U.S. patent application No. 61/366,899 filed on 22 Jul. 2010 and entitled DISPLAY MANAGEMENT SERVER and U.S. patent application No. 61/364,693 filed on 15 Jul. 2010 and entitled DISPLAY MANAGEMENT METHODS AND APPARATUS describe applications of gamut mapping to display image data on target displays. The disclosures of all of these applications are hereby incorporated herein by reference for all purposes as if fully set out herein.

There are various approaches to gamut mapping. One approach applies a mapping function to modify a first video signal to yield a modified video signal for display on a target display. The modified video signal may, for example, have a different color gamut and/or a different dynamic range from the first video signal. Another approach combines two or more video signals to yield a video signal for display on a target display. In some embodiments combining first and second video signals comprises interpolating between or extrapolating from pixel data of the first and second video signals. Approaches that combine first and second video signals to yield a modified video signal may control characteristics of the modified signal to suit a target display by one or more of changing the interpolation/extrapolation function used to combine the first and second video signals; altering parameters (such as weightings) used by an interpolation/extrapolation function and/or altering one or both of the first and second video signals before combining the first and second video signals.

Certain embodiments of the present invention incorporate gamut mapping with decoding image data. For example, in some embodiments gamut mapping is performed within a video data decoding pipeline on macroblocks or other sets of image data values prior to (upstream from) motion compensation. Such embodiments advantageously permit gamut mapping to be performed at a point in the decoding pipeline where the data rate is reduced. This in turn may permit gamut mapping with hardware and/or software that is reduced in complexity and/or cost.

Incorporating gamut mapping into a video decoder can result in improved efficiencies. In some embodiments the gamut mapping is configured to convert video content into content that has been adjusted for improved display on a specific type of target display. Such content may be called Display Dynamic Range (or "DDR") content. In some embodiments, the decoder receives a control signal and configures the gamut mapping in response to the control signal so as to yield output video data tailored for display on a target display or type of target display. The control signal may be indicative of characteristics of the target display.

In typical example embodiments a decoder is provided to decode video content that has been encoded for distribution, over a network, over a data communication link, for storage in a media file, through storage media like BluRay™, over the air (e.g. in a digital television broadcast signal) or the like. A decoder may be incorporated into another device such as a television, digital projector, computer, media player, set top box, internet gateway, or the like.

In concept, many modern video encoders (e.g. MPEG 2, MPEG 4, H.264) compress video data by removing temporal redundancy and spatial redundancy. Temporal redundancy is removed by analyzing what parts of the image change from frame to frame and, instead of encoding every frame separately, encoding differences between frames for at least some frames or parts of frames. For example, some MPEG video codecs encode certain frames (called "I" frames) separately. For other frames (called "P" frames and "B" frames) what is encoded are differences between the P or B frame and other frames. Spatial redundancy may be removed by encoding images in terms of spatial frequency components. Some examples of transformations that may be applied to extract spatial frequency components from image data are the discrete cosine transform (DCT) and the discrete wavelet transform (DWT). The resulting spatial frequency representation can then be compressed by selectively discarding some higher frequency components which are less visible to an observer (e.g. by quantizing spatial frequency coefficients).

Examples of video coders and decoders and transcoders are described below. The skilled practitioner has a wide range of options for implementing encoders and decoders and transcoders according to the examples described herein and according to other embodiments of the invention. For example, an encoder or decoder or transcoder or a part thereof may be implemented by the combination of a programmable data processor and software instructions executable on the data processor to cause the data processor to perform one or more encoding or decoding operations as described herein. For another example, an encoder or decoder or transcoder or a part thereof may be implemented by configuring configurable hardware such as a FPGA. Such embodiments may comprise a FPGA or other configurable logic device together with a configuration file which may be applied to configure the FPGA to perform one or more encoding or decoding operations as described herein. For another example, an encoder or decoder or transcoder or a part thereof may be implemented by fixed hardware such as an application specific integrated circuit or logic circuits arranged to perform one or more encoding or decoding operations as described herein. For another example, an encoder or decoder or transcoder or a part thereof may be implemented by a combination of the above.

In the following description the term pipeline is used (e.g. in the context encoding pipeline, decoding pipeline or transcoding pipeline) to refer to apparatus or sets of ordered method steps or processing operations that perform encoding, decoding or transcoding. It is not mandatory that apparatus include a separate unit or component corresponding to each processing operation or method step. As described above, for example, the combination of a data processor with suitable software instructions is one way to implement an entire encoding, decoding or transcoding pipeline.

The terms 'upstream' and 'downstream' are not limited herein to mean spatial locations but are used to refer to the order of data processing. Downstream refers to a direction of data processing flow toward an output (e.g. for an encoder, downstream relates to the direction of data flow from raw data to be decoded toward the output encoded data). Upstream refers to a direction of data processing flow toward an input (e.g. for an encoder, upstream relates to the direction of data flow from decoded output data toward raw data to be decoded). For example, a first stage in an apparatus can be said to be upstream from a second stage if the apparatus is arranged or configured such that certain data is processed in the first stage before being provided (directly or by way of one or more intervening stages) to the second stage. A first method step is executed upstream from a second method step if data processed by the first method step is passed on (directly or by way of one or more intervening method steps) to be processed in the second method step.

FIG. 1 illustrates an example video encoder 10. Encoder 10 receives video data 11 at input 12. Block 14 performs motion analysis. In block 14 video data for at least some frames is segmented into units which may be called macroblocks. The macroblocks are of a suitable size (as specified, for example, by the applicable compression standard). A macroblock block may comprise, for example, an 8×8 block of pixel values or a 16×16 block of pixel values. In this description, except where otherwise noted or necessarily implied, the term 'macroblock' is used to mean a block of video data available to be processed. The macroblock may be square or rectangular. A macroblock may be divided into smaller units for some processing steps and/or combined with all or a part of one or more other macroblocks for other processing steps. A macroblock may be made up of smaller blocks (sub-macroblocks) of image data or not. Different stages of an encoder or decoder may process macroblocks of different sizes or of the same size. As noted below it is not mandatory that all processing be performed on macroblocks. The following description describes processing macroblocks for convenience.

Macroblocks are analyzed for motion between frames. For example, each macroblock in a current frame may be compared to the image of a previous frame to identify a macroblock location in the previous frame containing image data most similar to the macroblock. A motion vector may identify the macroblock location in the previous frame.

Differences between the current macroblock and the macroblock location in the current frame may be determined and passed along the encoder pipeline. It is only necessary to pass along the encoder pipeline information regarding macroblocks having image content that has changed.

A transform such as a discrete cosine transform (DCT) is applied in block 16 to transform the macroblocks from the image (spatial) domain to the spatial frequency domain. Spatial frequency domain frequency coefficients for each macroblock are then quantized in block 18 to reduce the volume of data, as desired. The quantized macroblocks are then losslessly compressed using an entropy encoding algorithm at block 19 to produce encoded video data 21 which is output.

FIG. 2 illustrates an example video decoder 20. The decoding process performed by decoder 20 may comprise steps that perform the inverse of corresponding encoding steps and are performed in reverse order relative to the encoding steps. Here the term 'inverse' is used loosely since some steps (e.g. quantization) involve information loss and cannot be inverted, strictly speaking.

Encoded image data 21 is provided to entropy decoding block 22 which replaces code words in the encoded image data 21 with corresponding data values. The resulting data is provided to an inverse quantization block 24 which replaces values in the image data with corresponding values from one or more quantization tables. The resulting data is processed by an inverse transformation (e.g. an inverse discrete cosine transformation) in inverse transformation block 26. The resulting data is then processed by a motion compensation block 28 to yield decoded image data 29 for display, storage, further processing, etc.

The output from inverse transformation block 26 contains pixel values that will specify the luminance (and color in the case of a color image) of pixels in decoded image data 29.

The foregoing video decoder 20 and encoder 10 are provided as examples only. As is understood by those of skill in the art of video encoding and decoding, there are a wide variety of different implementations of encoders and decoders for video data that differ from one another in a wide variety of implementation details. The encoded video signal may be formatted according to any of a variety of standards. By way of example only, some video coding standards are: H.264 (also known as AVC (standing for "advanced video coding") or MPEG-4 part 10; or H.262 (also known as MPEG-2); or H.263 (also known as MPEG-4 part 2); and the like.

FIG. 3 illustrates a decoder 30 according to a simple example embodiment. Decoder 30 is similar to decoder 20 (and similar components are identified with the same reference numbers used in FIG. 2). Decoder 30 incorporates a gamut transformation block 32 that operates on macroblocks output by inverse transformation block 26. This permits application of a transformation block 32 that is optimized to work on data provided in macroblocks. Such a transformation block 32 may be efficient since macroblocks are typically much smaller than an overall image. In some embodiments, logic to perform the gamut transformations of gamut transformation block 32 is implemented in hardware (e.g. by fixed logic circuits or by the configuration of a configurable logic circuit such as an FPGA). Gamut-transformed macroblocks are provided to motion compensation block 28.

Gamut transformation block 32 may be controlled by a signal 33 indicative of the nature of a target display on which the video signal output from decoder 30 is being or will be displayed. The signal may control aspects of the gamut transformation performed (for example the amount of expansion or compression of a dynamic range of the output from the gamut transformation and/or the primary colors defining the gamut for the output of the transformation). In some embodiments, signal 33 is provided directly or indirectly by the target display. In other embodiments, signal 33 is provided directly or indirectly in response to a user input.

FIG. 3A illustrates a decoder 30A according to another simple example embodiment. Decoder 30A is similar to decoder 30 (and similar components are identified with the same reference numbers used in FIG. 3). In decoder 30A a gamut transformation block 32A is provided that operates on frequency-domain macroblocks at the output of entropy decoding block 22 or inverse quantization block 24.

In some embodiments gamut transformation block 32A operates on DC terms in the frequency-domain macroblocks. For example, gamut transformation block 32A may apply a tone curve to each of the DC terms. The tone curve may be static or may be variable based on metadata and/or on other values in the macroblock (for example the tone mapping may be variable and based at least in part on an energy indicated by higher frequency coefficients in the frequency-domain macroblock).

A deblocking filter may optionally be applied to mitigate any blocking artifacts that may arise as a result of modification of DC terms. In some embodiments, gamut transformation block 32A keeps track of adjustments to DC terms of different frequency-domain macroblocks and controls adjustment of the DC terms such that the amount of adjustment of DC terms in neighboring macroblocks does not differ by more than a threshold amount.

In some embodiments, tone mapping is determined with reference to the DC terms in frequency-domain macroblocks but applied downstream in the decoding pipeline. This is illustrated in FIG. 3B which shows a decoder in which tone-mapping to be applied to pixel values is determined at block 33 and the tone mapping is applied by a gamut transformation block 32B which operates on spatial-domain macroblocks at the output of inverse transformation block 26 and/or gamut transformation block 32C which operates on decoded image data yielded by motion compensation block 28. Embodiments as illustrated in FIG. 3B which perform tone-mapping in the spatial domain at a downstream location based at least in part on values of DC frequency coefficients monitored at an upstream location can be advantageous in that the possibility that the tone mapping will emphasize block boundaries in the decoded image can be reduced.

In some applications it is desirable to provide encoded image data that includes different versions of the same video content that can be decoded to provide decoded image data suitable for displays having different capabilities. For example, it may be desirable to provide video data that can be decoded for display on standard dynamic range displays and can also be decoded for display on high dynamic range displays. For example, first video data and second video data may be independently encoded and packaged together for distribution. One of the first and second video data may be, for example, standard dynamic range video data and the other one of the first and second video data may be enhanced video data. The enhanced video data may provide a higher dynamic range and/or greater bit-depth and/or broader color gamut than the standard dynamic range video data.

One video data format suitable for encoding high dynamic range video data is the VDR (Visual Dynamic Range) format. VDR format is a video format described in co-owned PCT Application No. PCT/US2010/022700 entitled "EXTENDED DYNAMIC RANGE AND EXTENDED DIMENSIONALITY IMAGE SIGNAL CONVERSION AND/OR DELIVERY VIA LEGACY VIDEO INTERFACES" which is hereby incorporated herein by reference for all purposes. In some embodiments the encoded image data is in a VDR format.

The second video data may provide a video signal for displays having greater capabilities while the first video data provides a video signal for displays having lesser capabilities or vice versa. In some embodiments the first video data may provide a video signal for displays that have greater capabilities in some respects and lesser capabilities in other respects than displays for which the second video data is intended.

In some embodiments a gamut transformation unit may operate on such encoded video to yield an output comprising video data that is different from both the first and second video data. In some such embodiments the output video data is obtained by combining the first and second video data. In some such embodiments the output video data is interpolated (or extrapolated) from the first and second video data.

For example, it may be desired to display video content provided in the first and second video data on a target display that has capabilities (e.g. color gamut and/or dynamic range) that are better than a standard display and so can display all image information in the first video data but are not sufficient to display all of the image information in the second video data. In such cases it may be desirable to generate third video data that fully exploits the capabilities of the target display by interpolating between the first and second video data. The weighting given to the first and second data in the interpolation may depend on a measure of the capabilities of the target display relative to the capabilities required to fully reproduce the first and second video data. As another example, the target display may have capabilities that are more than adequate to display all of the image information in both the first and second video data. In such cases it may be desirable to generate third video data that fully exploits capabilities of the target display by extrapolation from the first and second video data.

Figure 4:
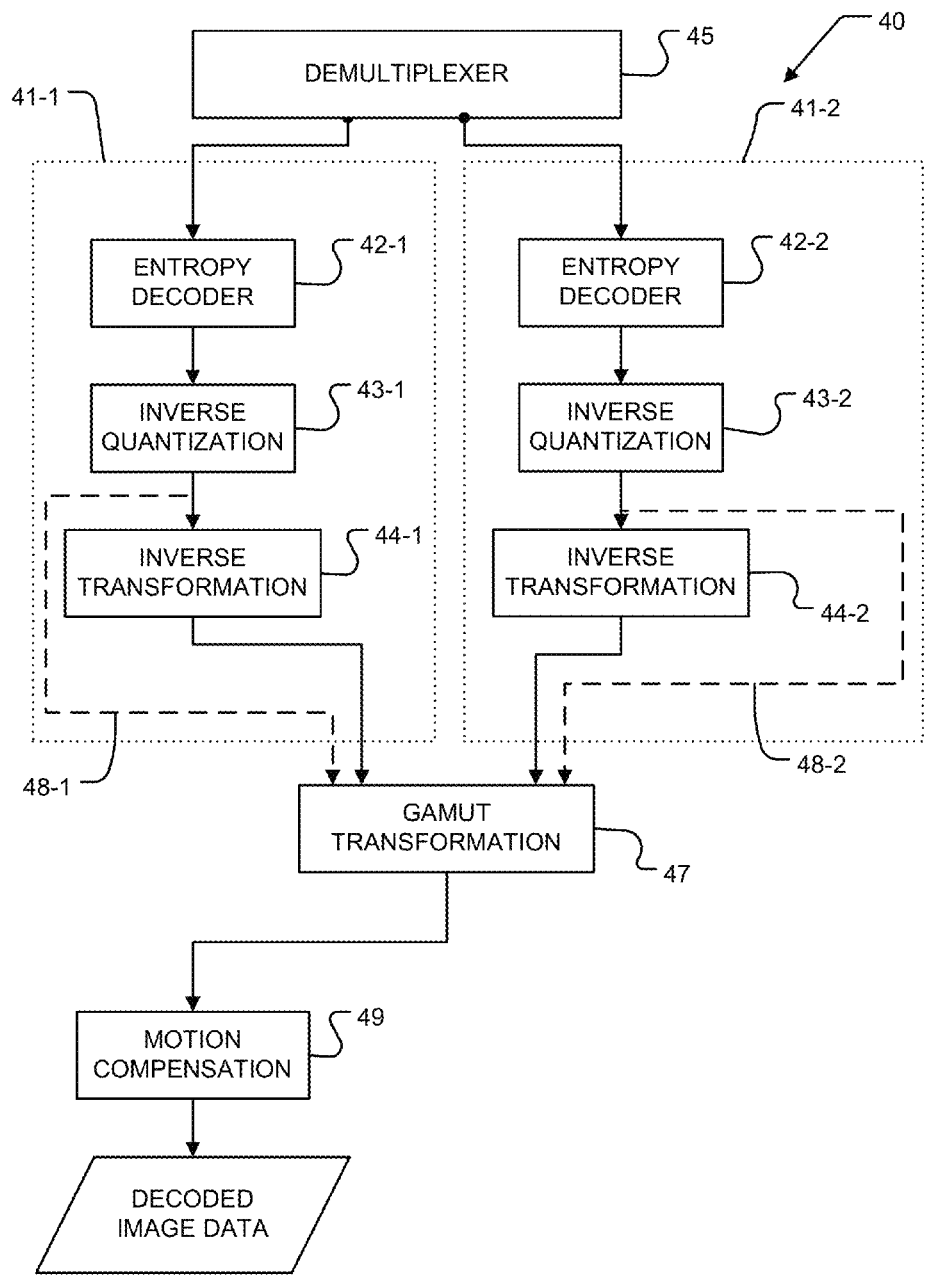
FIG. 4 is a block diagram illustrating an example decoder according to another example embodiment in which first and second sections respectively receive and process first and second streams of video data.

A decoder for such video data may provide essentially separate first and second decoders which operate in parallel to decode first and second video data. Gamut mapping may be incorporated into such decoders in a number of different ways. FIG. 4 illustrates an example decoder 40. Decoder 40 has first and second sections 41-1 and 41-2 (collectively 41) that respectively receive and process first and second streams of video data.

Each section 41 incorporates a decoder, for example, in the illustrated embodiment, each section 41 incorporates an entropy decoder (blocks 42-1 and 42-2), an inverse quantization block (blocks 43-1 and 43-2) and an inverse transformation block (e.g. an inverse discrete cosine transformation block) (blocks 44-1 and 44-2). Each of blocks 44-1 and 44-2 output decoded macroblocks.

In the decoder 40 illustrated in FIG. 4, independent video streams carrying first and second video data are respectively processed in sections 41-1 and 41-2. The streams are optionally demultiplexed by a demultiplexer 45.

In some embodiments combination (e.g. by interpolation or extrapolation) of pixel data is performed on pixel data in macroblocks output by inverse transformation blocks 44. This can provide a single stream of resulting interpolated data which may be subsequently subjected to motion compensation to yield output image data. In such embodiments, only a single motion compensation stage is required. This can be advantageous as motion compensation can be computationally and/or hardware intensive. Decoder 40 assumes that the data streams of sections 41-1 and 41-2 have been segmented into the same macroblock regions and share motion vectors. This is a reasonable constraint as both streams are spatially correlated (i.e. they are different representations of the same basic image content).

Gamut transformation block 47 modifies colors and/or tones of pixels in macroblocks output by inverse transformation blocks 44-1 and 44-2. In the illustrated embodiment, a gamut transformation block 47 combines the outputs from inverse transformation blocks 44-1 and 44-2 and optionally also performs one or more additional gamut transformation on the resulting data. The additional gamut transformation may be performed after or before combining the outputs from inverse transformation blocks 44-1 and 44-2 into one signal. The additional gamut transformation may, for example, transform the video data to another color space, clip or map any values that are out-of-gamut for a specified gamut adjust tones in response to ambient lighting conditions at a target display or for ambient lighting conditions in a target viewing environment or the like. The resulting data is then processed by motion compensation block 49 to yield decoded image data suitable for display on a target display. It is advantageous that gamut transformation block 47 is typically required to process a smaller volume of data than would be the case if gamut transformation were performed instead on the reconstructed image data at the output of motion compensation block 49.

Optionally, as indicated by data paths 48-1 and 48-2, gamut transformation block 47 receives frequency domain macroblocks output from inverse quantization block 43-1 and/or inverse quantization block 43-2 instead of or in addition to receiving output from inverse transformation blocks 44. Gamut transformation block 47 may operate on the spatial domain macroblocks, the frequency domain macroblocks, or a combination of the two.

When working with spatial domain macroblocks (e.g. macroblocks output from inverse transformation blocks 44-1 and 44-2) gamut transformation block 47 may interpolate between or extrapolate from macroblocks of the first and second video data.

When working with frequency domain macroblocks (i.e. macroblocks output from inverse quantization blocks 44), gamut transformation block 47 may create an interpolated macroblock for example by: interpolating/extrapolating between the DC terms only (the DC terms represent the average luminance for each macroblock); or interpolating/extrapolating between the DC terms and also one or more additional frequency coefficients for corresponding frequency-domain macroblocks in the first and second signals.

As noted above, in this embodiment or any other embodiment where DC frequency coefficients are modified, a deblocking filter may optionally be applied to mitigate any blocking artifacts that may arise as a result of modification of DC terms. In some embodiments, gamut transformation block keeps track of adjustments to DC terms of different frequency-domain macroblocks and controls adjustment of the DC terms such that the amount of adjustment of DC terms in neighboring macroblocks does not differ by more than a threshold amount.

Figure 4A:
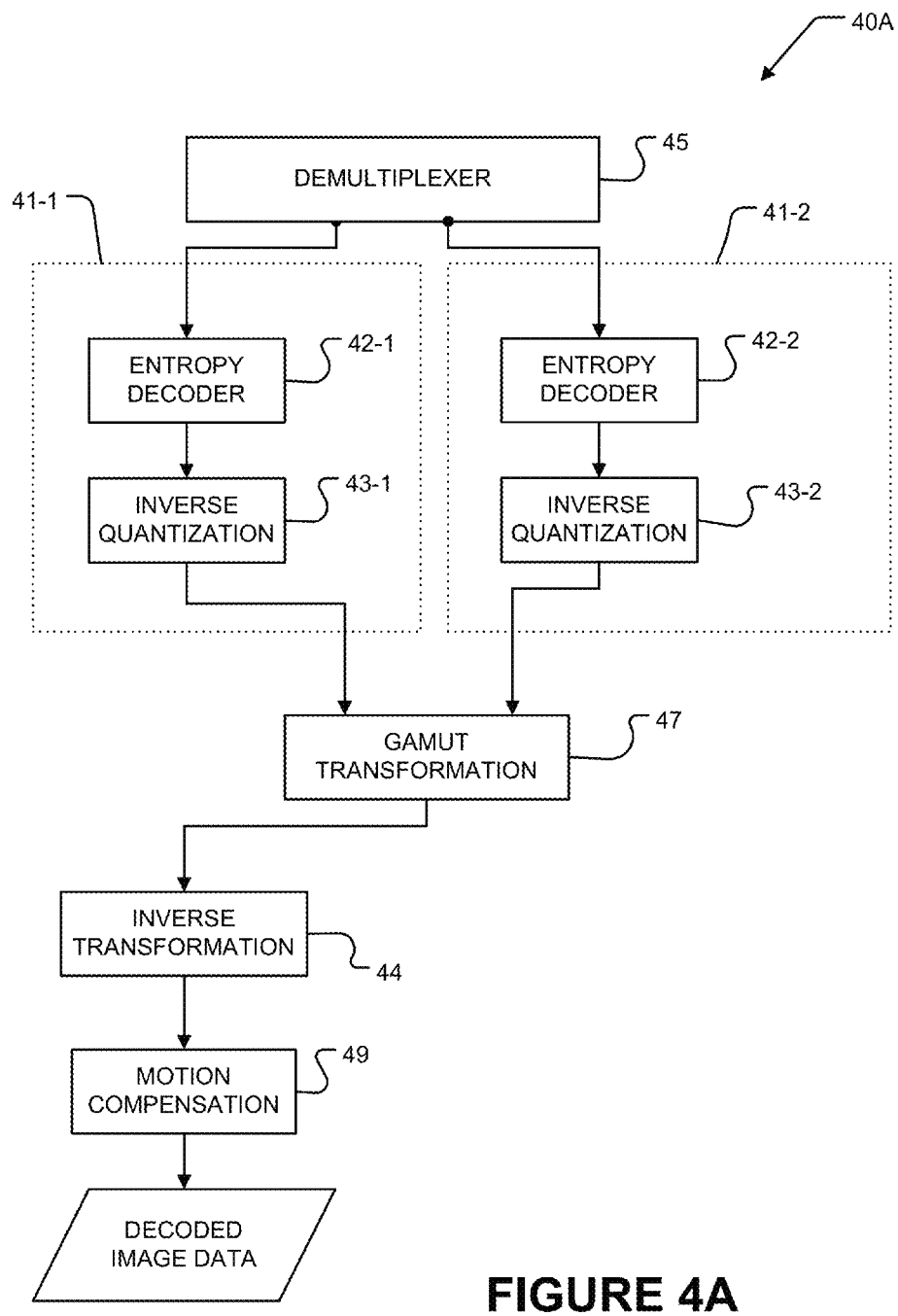
FIG. 4A is a block diagram illustrating an example decoder according to an alternative embodiment in which a gamut transformation block receives output from inverse quantization blocks.

FIG. 4A shows a decoder 40A according to an alternative embodiment in which gamut transformation block 47 receives output from inverse quantization blocks 43-1 and 43-2 and the output from gamut transformation block 47 is processed in a single inverse transformation block 44 and a single motion compensation block 49.

When working with both frequency domain and spatial domain macroblocks, gamut transformation block 47 may use DC terms from the frequency domain macroblocks to quickly calculate and approximate histogram or geometric mean for an image. Frequency domain coefficients may be applied to set parameters of an adaptive gamut transformation. For example in some embodiments gamut transformation block 47 is configured or configurable to operate in an adaptive mode in which one or more mappings are determined, at least in part, on the basis of image content in the incoming video signal(s).

In an example of such an embodiment, gamut transformation block 47 is configured to apply a mapping for one attribute based on values of one or more other attributes. For example, a luminance mapping for a pixel may be selected or determined in part based on color values for the pixel. For another example, a mean luminance of an image reproduced on a target display device over some time frame may be used to estimate the adaptation of the eyes of a viewer and one or more mappings may be based in part on the estimated adaptation. In another example of such an embodiment, gamut transformation block 47 is configured to apply a mapping for one attribute which is selected based on whether or not the pixel is identified as corresponding to a light source (for example by a local analysis of the image or by metadata identifying light source locations). These results may be applied in generating interpolation weights for the spatial domain macroblocks.

One way to efficiently package video data that can be decoded to provide two or more streams of video data suitable for display on displays having different capabilities (e.g. different gamuts and/or different dynamic ranges) is to provide a first encoded video signal encoding first video data suitable for display by displays having a first capability level (e.g. a standard dynamic range) and to encode and provide along with the first video signal a difference signal. The difference signal indicates differences (i.e. dissimilarities which may be but are not necessarily the results of mathematical subtraction operations) between the first video data and second video data suitable for displays having a second capability level. For example, the difference signal may comprise a residual image, a ratio image, or the result of another operation that indicates differences between the first and second video data. The second capability level may, for example, include an extended dynamic range and/or an extended color gamut.

In general, such schemes provide two streams of video data to be decoded. One stream representing the first video data and a second stream representing a difference signal indicative of the differences between the first and second video data. The two streams permit reconstruction of both the first and second video data.

The second video signal may subsequently be recreated by decoding the first video signal and the difference signal and then combining the first video signal and the difference signal to yield the second video signal. The difference signal may be made available together with the first video signal in any suitable manner. For example the first video signal and difference signal may be packaged together in a suitable data format. One example is to package the difference signal by applying SVC or AVC extensions to the H.264 standard.

One example of a scheme which provides a difference signal is described in Ward et al. WO 2005/104035 entitled ENCODING, DECODING AND REPRESENTING HIGH DYNAMIC RANGE IMAGES which is hereby incorporated herein for all purposes.

Some schemes for encoding data that can be decoded to provide output suitable for display over different dynamic ranges are called "bit-depth-scalable". Examples of bit-depth-scalable encoding schemes are described in Winken et al., *Bit-depth Scalable Video Coding* Proc. IEEE Intl. Conf. on Image Processing (ICIP2007), 2007; and G. Ward et al. *Subband Encoding of High Dynamic Range Imagery* ACM Intl. Conf. Proc. Series, vol. 73, pp. 83-90, 2004.

Figure 5:
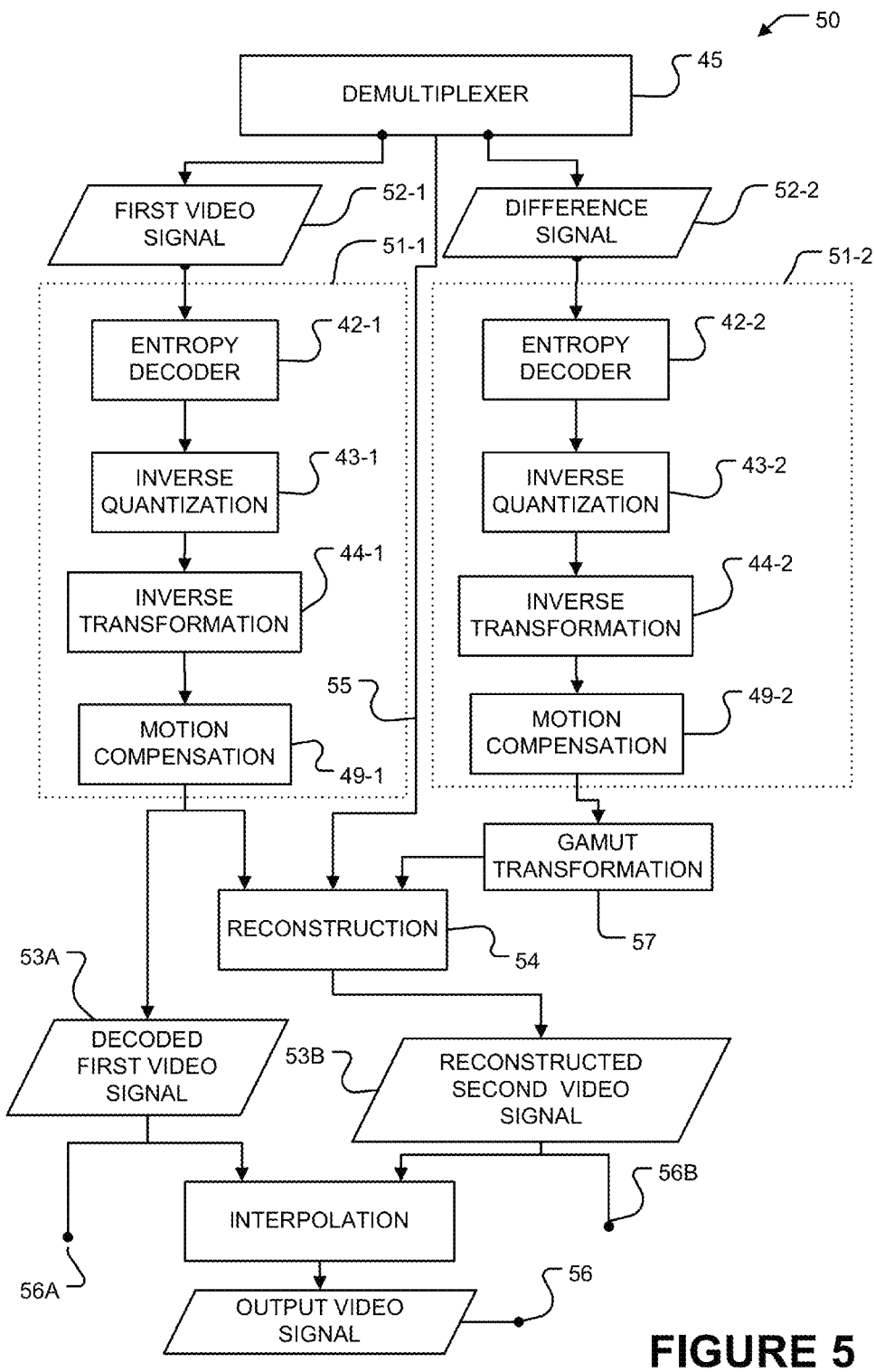
FIG. 5 is a block diagram illustrating a decoder according to another example embodiment in which a gamut transformation is applied to a difference signal.

FIG. 5 is a block diagram illustrating a decoder 50 in which a gamut transformation is applied to a difference signal. Decoder 50 has a first data path 51-1 that receives and decodes a first video signal 52-1. A second data path 51-2 receives and decodes a difference signal 52-2. Difference signal 52-2 is combined with first video signal 52-1 at reconstruction block 54. Optionally the decoded first video signal 53A is output at output 56A.

Reconstruction block 54 may reconstruct a second video signal 53B from first video signal 52-1 and decoded difference signal 52-2 by combining first video signal 52-1 with difference signal 52-2 according to some function. For example, if difference signal 52-2 is a residual image the function may involve adding pixel values in the difference signal to corresponding pixel values in the first video data; if difference signal 52-2 is a ratio image the function may involve multiplying pixel values in the difference signal with corresponding pixel values in the first video data; etc. Optionally the reconstructed video signal 53B is output at output 56B.

In an example embodiment, interpolation block 54 generates an output video signal 53 by combining the decoded first video signal 53A and the reconstructed second video signal 53B. Output video signal 53 is presented at output 56.

In some embodiments an expansion function is provided with the video data. An optional expansion function 55 is depicted in FIG. 5. The expansion function may, for example, affect how two streams of video data are combined to yield output video data for display on a particular target display or specify a particular mapping to be applied to first input video data to yield modified-gamut video data. The mapping may, for example, modify one or both of tones and chromaticities in image pixels. An expansion function may specify a mapping of tone and/or gamut to be applied to one of the first or second video data to obtain video data having a modified tone (dynamic range) and/or gamut. An expansion function may be specified, for example, in metadata associated with the video data.

In decoder 50 of FIG. 5, the expansion function, if present, may be applied to control how output video signal 53 is determined from first video signal 52-1 and second video signal 52-3. For example, the expansion function 55 may determine weights to be used while extrapolating from or interpolating between first video signal 52-1 and second video signal 52-3. The expansion function 55 may be as simple as an interpolation coefficient value or may be more complicated. The expansion function 55 may comprise a gamut mapping to be applied to one or both of first video signal 52-1 and second video signal 52-3.

Decoder 50 includes a gamut mapping block 57 that operates on the output from motion compensation block 49-2 of path 51-2. Gamut mapping block 57 modifies difference video signal 52-2 upstream from reconstruction block 54. The modification may make second video data 53B obtained by combining the (modified) difference signal with the first video signal directly appropriate for display on a target display or alter the difference signal such that output video data obtained by combining the reconstructed second video signal with the first video signal in a specified manner will be appropriate for display on the target display. The modification may comprise applying a linear or non-linear function to the difference video signal, for example.

Figure 6:
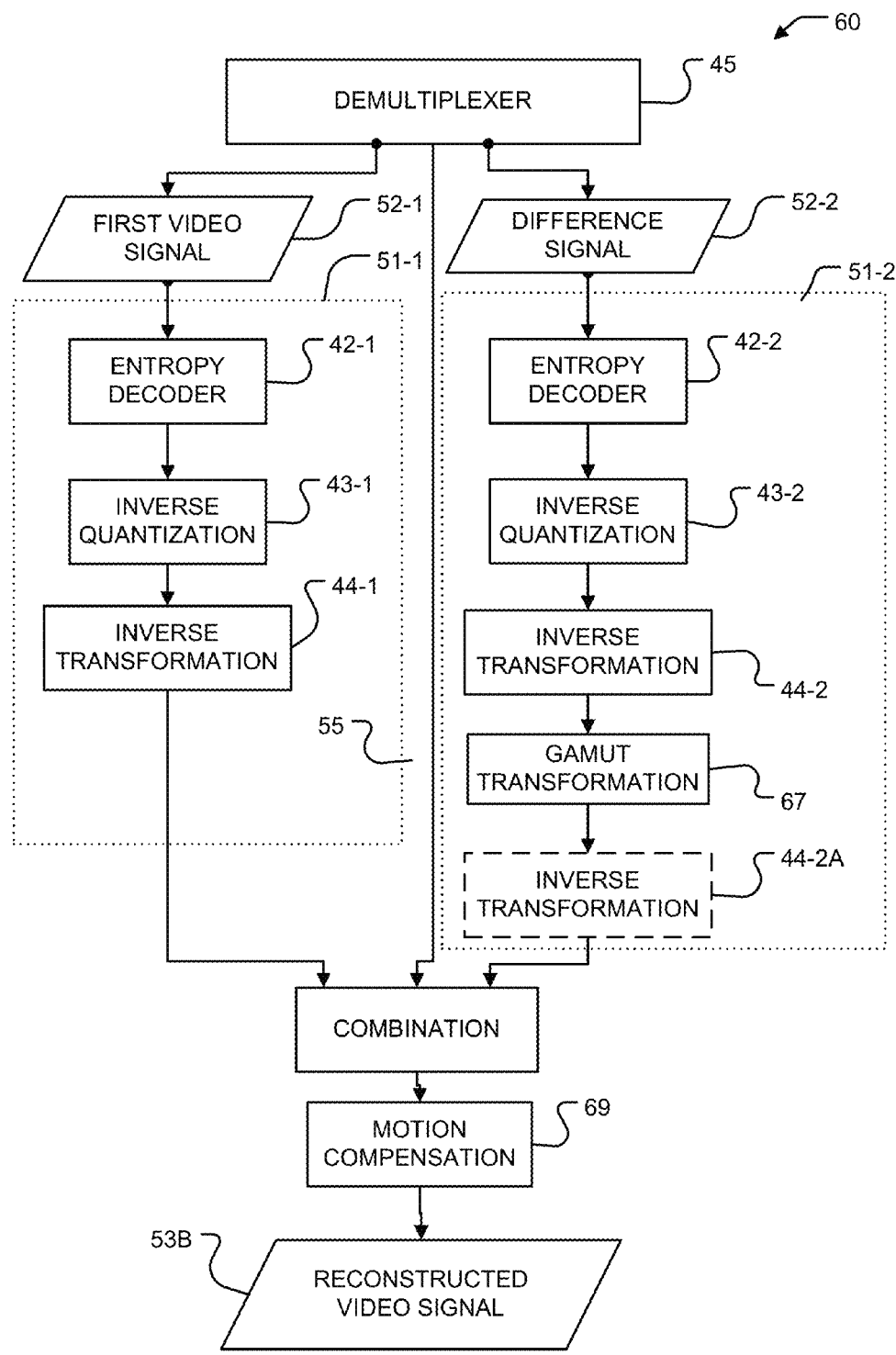
FIG. 6 is a block diagram illustrating an example decoder according to another example embodiment.

FIG. 6 illustrates an example decoder 60 according to another example embodiment. Decoder 60 may receive first video signal 52-1 and a difference signal 52-2 as described above. A difference between decoder 60 and decoder 50 is that, in decoder 50, a gamut transformation block 67 is provided to operate at the macroblock level within a decoder path 61-2 for difference signal 52-2. In decoder 60 combination of the first video signal 51-1 and second video signal 52-2 is also performed at the macroblock level, prior to motion compensation, which is provided by block 69. Decoder 60 has the advantages over decoder 50 that, for the same input signals, the amount of data to be processed by gamut transformation block 67 can be significantly smaller than the amount of data to be processed by gamut transformation block 57. Also, decoder 60 has only one motion compensation block.

In some embodiments, first video signal 52-1 and difference signal 52-2 are encoded in such a manner that difference signal 52-2 is directly comparable to a difference component of first video signal 52-1. For example, encoding may comprise encoding an I-frame for first video data and performing motion analysis on the first video data to generate motion vectors for other frames of the first video data. Differences between the data in the other frames and the data for corresponding parts of the I-frame indicated by the motion vectors may be encoded in first video signal 52-1. Second video data depicting the same content as first video signal 52-1 may be encoded in difference signal 52-2. For I-frames, second video signal 52-1 may encode differences between the second video data and the first video data. For other frames, second video signal 52-2 may use the same motion vectors used to encode first video signal 52-1. Differences between the data in the other frames of the second video data and the data for corresponding parts of the I-frame of the first video data indicated by the motion vectors may be encoded in second video signal 52-1. This facilitates interpolation between or extrapolation from first video signal 52-1 and difference signal 52-2.

As in decoder 40 of FIG. 4, gamut transformation block 67 may process spatial domain macroblocks and/or frequency domain macroblocks. Where block 67 processes frequency domain macroblocks and not spatial domain macroblocks then inverse transformation block 44-2 may be moved downstream of gamut transformation block 67 as indicated by block 44-2A.

When working with spatial domain macroblocks only, gamut transformation block 67 may apply a transformation directly to the pixel data in the macroblocks.

When gamut transformation block 67 operates on frequency domain macroblocks only, gamut transformation block 67 may optionally modify the macroblocks by modifying DC components only. The DC components correspond to average luminance (or chrominance) of the portion of the image within the macroblock.

When gamut transformation block 67 operates on both frequency and spatial macroblocks, information in the frequency macroblocks may be applied to improve or accelerate the gamut transformations. For example: The DC components of frequency macroblocks indicate average luminance or chromanance for the macroblocks. This information may be used to quickly calculate statistical information for the current image such as approximate histograms or geometric means of the image or portions thereof.

Figure 7:
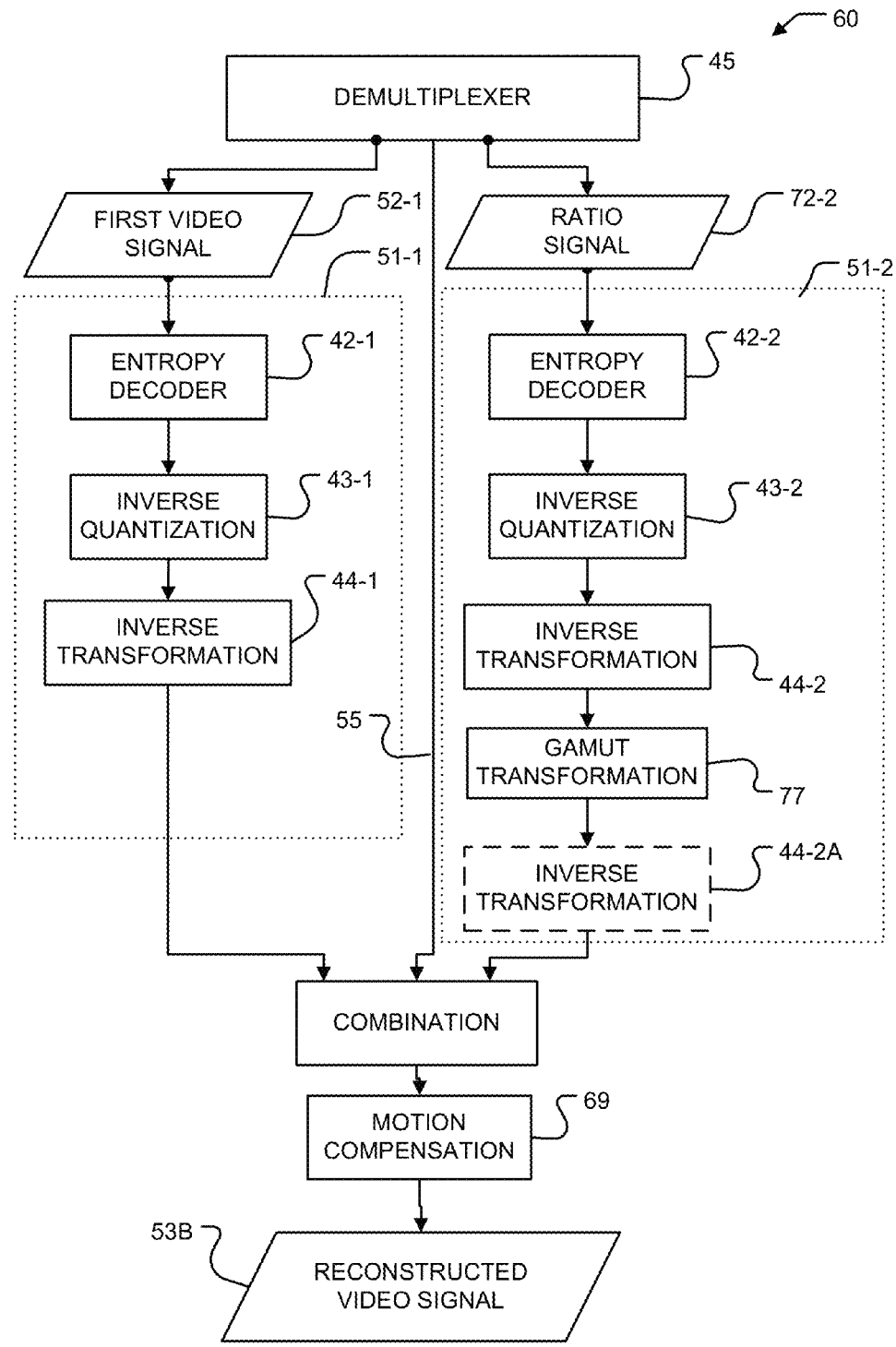
FIG. 7 is a block diagram illustrating an example decoder according to another example embodiment that is constructed to operate on video data which comprises an encoded first video signal and an encoded difference signal which comprises ratio data.

FIG. 7 illustrates an example decoder 70 according to another example embodiment. Decoder 70 is similar to decoder 60 except, decoder 70 is specifically constructed to operate on video data which comprises an encoded first video signal 52-1 and an encoded difference signal 72-2 which comprises ratio data.

In decoder 70 a gamut transformation is performed at the macroblock level within the decoding path for ratio signal 72-2.

As in decoder 40 of FIG. 4, gamut transformation block 77 may process spatial domain macroblocks and/or frequency domain macroblocks. Where block 77 processes frequency domain macroblocks and not spatial domain macroblocks then inverse transformation block 44-2 may be moved downstream of gamut transformation block 77 as indicated by block 44-2A.

Figure 8:
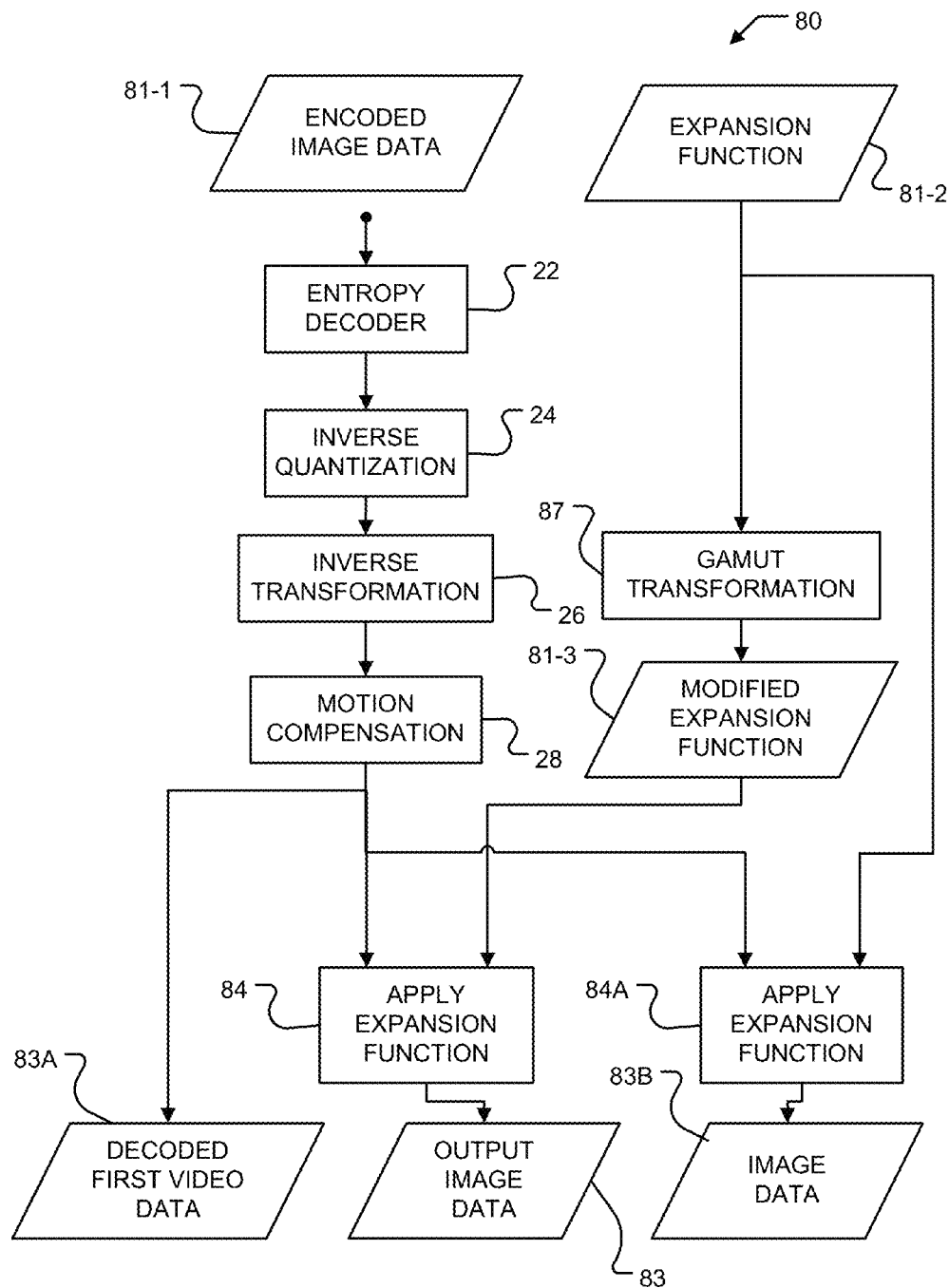
FIG. 8 is a block diagram of another example decoder that can operate on encoded video data that comprises an encoded first video signal and an expansion function.

FIG. 8 is a block diagram of another example decoder 80. Decoder 80 is intended to operate on encoded video data that comprises an encoded first video signal 81-1 and an expansion function 81-2. A second video signal may be obtained by applying expansion function 81-2 to video data of first encoded video signal 81-1.

Since no difference stream is required in this embodiment, a gamut transformation may be performed by altering the expansion function and/or by applying another function in conjunction with the expansion function. The gamut transformation may modify the effect of the expansion function such that the output data 83 is adapted for display on a particular target display.

In the illustrated embodiment, a gamut transformation block 87 receives expansion function 81-2 and modifies it to produce a modified expansion function 81-3. The modified expansion function 81-3 is applied in block 84 to first video signal 81-1 to yield an output signal 83. Modifying the expansion function may be achieved using fewer resources than would be required to modify the image data directly. Optionally the first video signal may be provided as an output as indicated by 83A. Optionally as indicated by block 84A the unmodified expansion function may be applied to first video signal 81-1 to yield an additional output signal 83B.

Figure 8A:
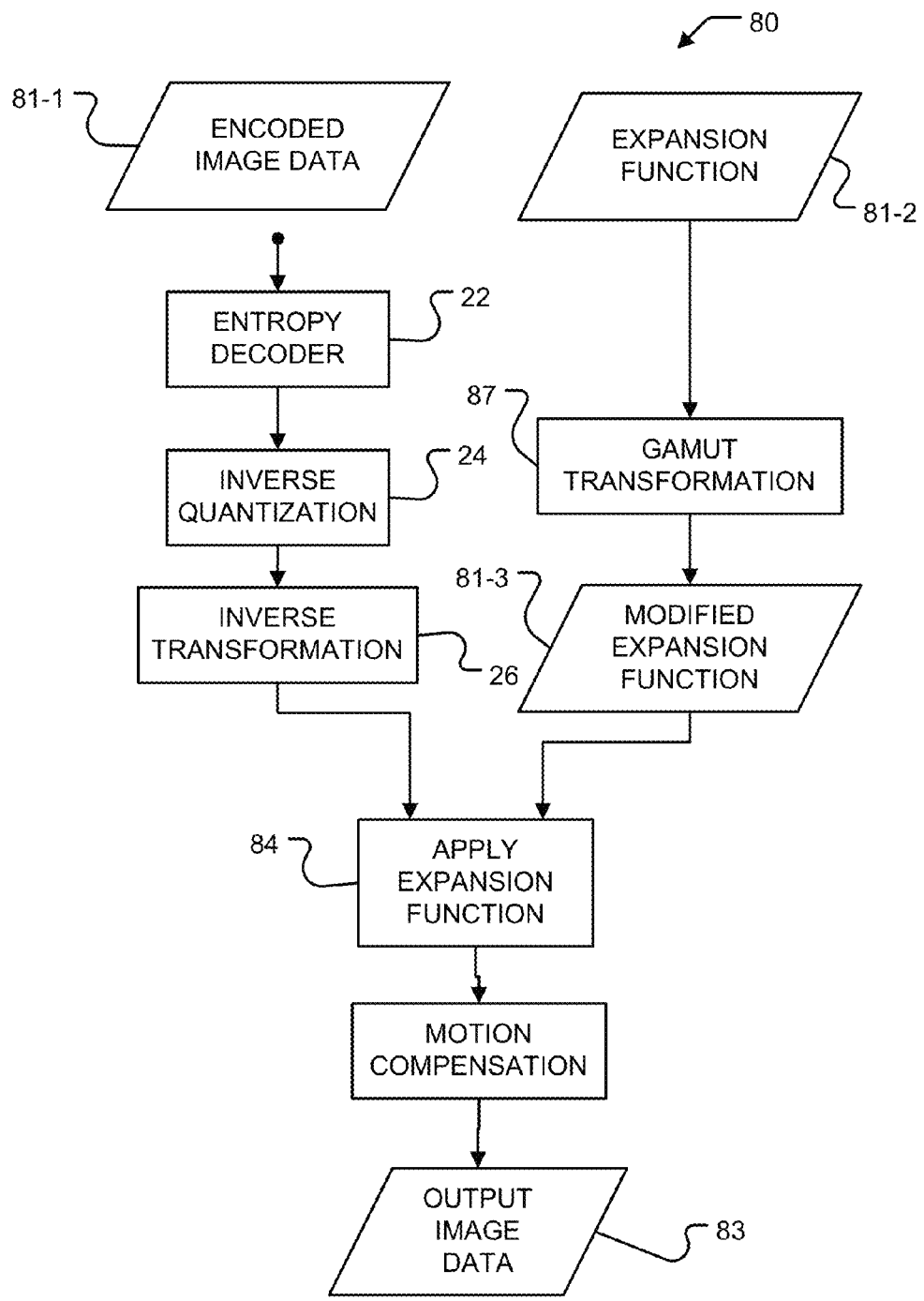
FIG. 8A is a block diagram illustrating a decoder according to an alternative embodiment in which a modified expansion function is applied to a video signal upstream from a motion compensation block.

FIG. 8A illustrates a decoder 80A that is similar to decoder 80 except that the modified expansion function is applied to the first video signal 81-1 upstream from a motion compensation block 84.

Gamut transformation, as described herein may also be integrated into the operation of a transcoder. In this case, an encoded video stream is partially decoded, modified by a gamut transformation block, and then re-encoded. The resulting encoded stream may carry video tailored for a specified target display or class of target displays. Such transcoders may be applied in streaming video applications where a single VDR or other high-quality encoded source stream is transcoded into multiple display-optimized streams of video data. The gamut transformation block may optionally change a format of the signal such that the re-encoded output signal has a different image data format than that of the original encoded video stream and/or the re-encoded output signal is based on a different color model than the original encoded video stream.

Figure 9:
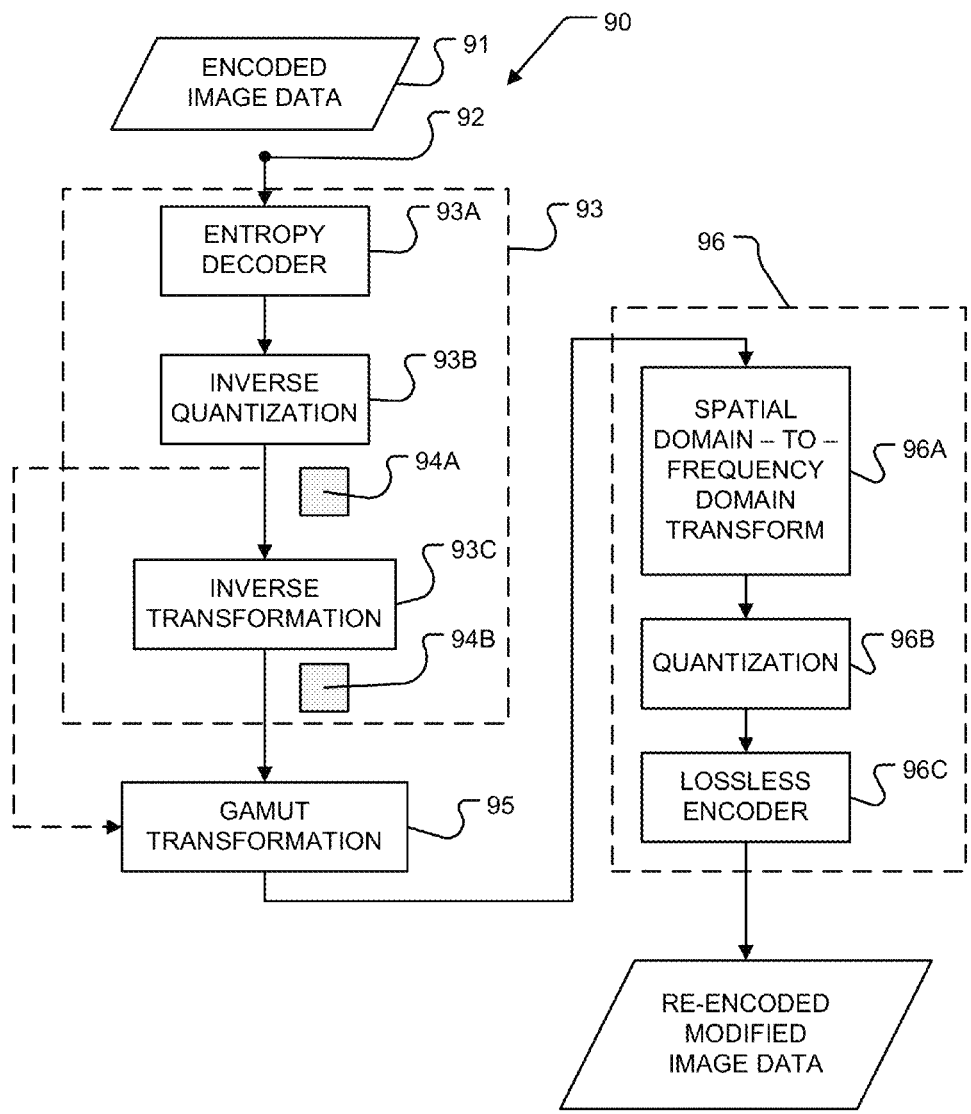
FIG. 9 is a block diagram illustrating an example transcoder that incorporates gamut transformation.

FIG. 9 illustrates an example transcoder 90. Notably, transcoder 90 does not require a motion compensation block. Transcoding may be performed at the macroblock level. Transcoder 90 receives encoded video data 91 at an input 92. Encoded video data 91 is processed in a partial decoder 93. Partial decoder 93 comprises an entropy decoding block 93A, an inverse quantization block 93B and an inverse transformation block 93C that performs an inverse DCT or other inverse transformation. Frequency domain macroblocks 94A are provided at the output of inverse quantization block 93B. Spatial domain macroblocks 94B are provided at the output of inverse transformation block 93C.

Gamut transformation block 95 may operate on one or both of frequency domain macroblocks 94A and spatial domain macroblocks 94B for example, as described above. The modified macroblocks output by gamut transformation block 95 are re-encoded for further transmission, storage etc. by a partial encoder 96. Partial encoder 96 includes a transformation block 96A that performs a transformation such as a DCT, a quantization block 96B that quantizes frequency coefficients yielded by block 96A and a lossless encoding block 96C. An encoded output signal from partial encoder 96 is distributed for eventual display on a target display.

It is not mandatory that partial encoder 96 encode the video data in the same video data format processed by partial decoder 93. Partial encoder 96 may encode the video data in a different format in some embodiments.

In some embodiments, operation of a gamut transformation block is adjusted based on frequency coefficients retrieved at a location upstream from an inverse transformation block. One example of the application of such frequency coefficients is to use the frequency coefficients to quantify the level of image detail in a macroblock. This information may be used to assess the impact of tone and gamut clipping or crushing in the image region corresponding to the macroblock. For example, a macroblock where the frequency coefficients corresponding to higher spatial frequencies are large (e.g. larger than a threshold or large compared to a DC component or the like) includes a greater level of image detail than a macroblock for which the higher frequency coefficients are small. Macroblocks that include more than a threshold amount of image detail may be processed according to a more intensive processing that avoids tone and gamut clipping or crushing. Macroblocks that include less than the threshold amount of detail may be processed according to a less intensive processing.

As another example, a level of image detail derived from frequency coefficients may be applied as an indicator of saliency (e.g. macro blocks in which frequency components corresponding to higher spatial frequencies have larger values contain more detail and are likely to be of more interest). This information may be used to adjust mapping performed by a gamut transformation. For example, the average luminance of the salient regions could be determined using a detail-level weighted geometric mean of the input image.

In some embodiments, encoding and decoding operations are performed separately for different pixel values. For example, for image data specifying a luminance or similar value for each pixel together with one or more chrominance or similar values, a luminance (tone) image may be encoded or decoded separately from images for chrominance pixel values. As another example, in an RGB image, images for red, green and blue pixel values may be separately encoded and/or decoded. In such embodiments gamut mapping techniques as described herein may be applied in the decoding or encoding of one or more of the pixel value images.

Methods and apparatus as described herein have particular benefits when applied to decoding video signals but are not limited to video signals. Such methods and apparatus may be applied to decoding still images also.

A gamut transformation block may be integrated into an encoder for image data. The gamut transformation block may operate on macroblocks downstream from a motion estimation block. The gamut transformation block may operate on macroblocks in the spatial domain (e.g. upstream from a spatial-domain-to-frequency domain transformation) or on macroblocks in the frequency domain. The gamut transformation block may receive control signals that control the degree to which the signals being processed are altered by the gamut transformation block. Such signals may come from any of a wide range of sources.

Figure 10:
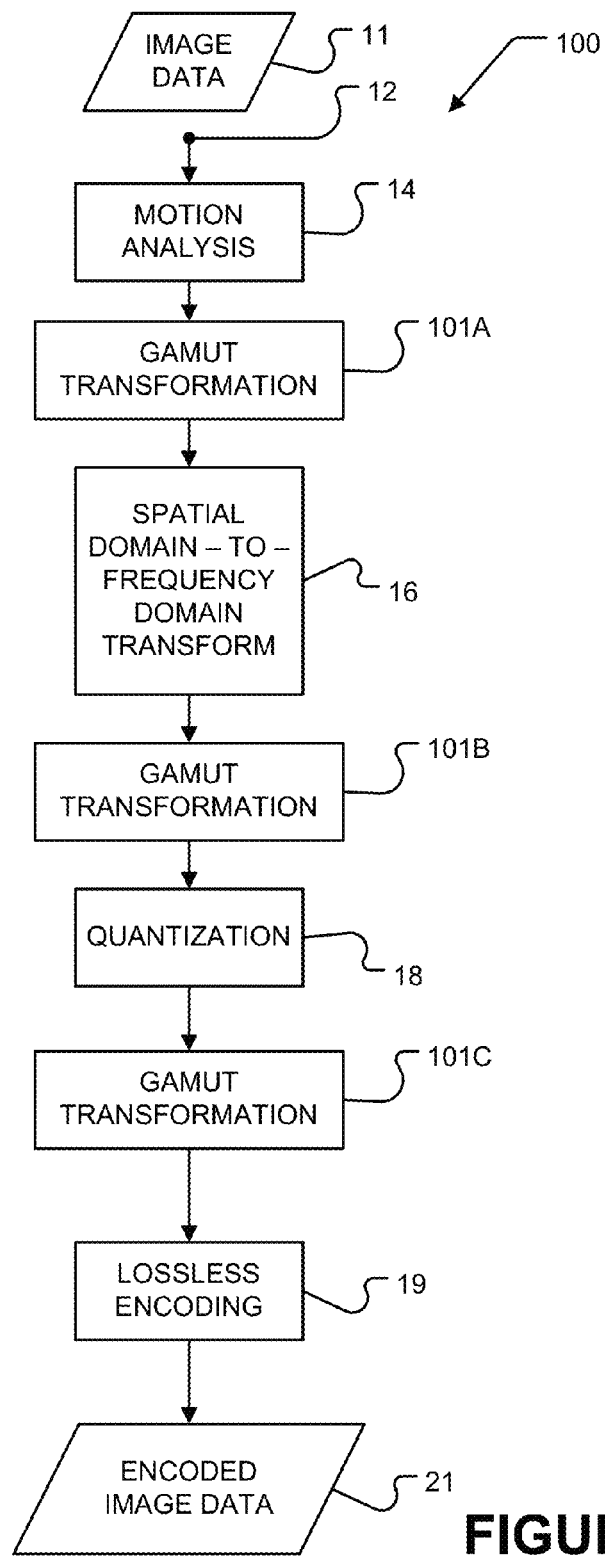
FIG. 10 is a block diagram illustrating an example encoder that incorporates gamut transformation.

FIG. 10 illustrates an example encoder 100 according to an example embodiment, the encoder includes a gamut transformation block. Three gamut transformation blocks 101A, 101B and 101C are illustrated in FIG. 10. Encoder 100 may include one or more of these gamut transformation blocks, for example.

It is not mandatory that methods as described herein be performed in real time or be performed continuously without interruption. In some embodiments, macroblocks or other intermediate data are written to a storage medium where they are stored for a time before being retrieved for further processing. Video encoders according to such embodiments may be applied to advantage in the distribution of video. For example, one could partially encode a video stream and store the result. This could be achieved, for example, by encoding as indicated in FIG. 10 but storing the resulting partially-encoded data just prior to one of the indicated gamut transformation stages 101A, 101B and 101C. For example, in one embodiment a video signal is processed by motion analysis block 14 and spatial-to-frequency domain transformation block 16 and then stored.

When it is desired to export the video for display on a particular target display then the partially-encoded data may be retrieved and processed through the gamut transformation block 101 (configured to perform a gamut transformation appropriate for the target display) and the remaining encoding stages of FIG. 10. Advantageously the gamut transformation and remaining encoding stages may optionally be executed in real time or faster since those stages tend to be much less computationally intensive than motion analysis block 14.

While the above image processing apparatus and methods has included description of various operations applied to 'macroblocks' (as broadly defined above), some such operations may be applied to regions, slices, or other areas of arbitrary sizes and shapes or other sets of pixel data in spatial or frequency domains. Where methods as described herein are applied in the context of image encoding or decoding according to a standardized process then it can be convenient and advantageous to perform processing operations as described herein on the macroblocks or other image portions that the standardized process handles or on portions of those macroblocks or other image areas. However, this is not mandatory in all embodiments. For example, certain processing steps as described herein may be performed on sets of pixel data in spatial or frequency domains obtained by combining all or parts of a plurality of macroblocks or other image areas as specified in a standard relating to image encoding and/or decoding.

The above detailed description of examples of the technology is not intended to be exhaustive or to limit the invention to any of the precise forms disclosed above. While examples of various systems are described above for illustrative purposes, various modifications are possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

Image processing and processing steps as described above may be performed in hardware, software (including 'firmware') or suitable combinations of hardware and software. Certain implementations of the invention comprise computer processors which execute software instructions which cause the processors to perform a method of the invention. For example, one or more processors in a video workstation, set top box, display, video projector, transcoder or the like may implement methods as described herein by executing software instructions in a program memory accessible to the processors. For example, such image processing may be performed by a data processor (such as one or more microprocessors, graphics processors, digital signal processors or the like) executing software and/or firmware instructions which cause the data processor to implement methods as described herein. The software and other modules described herein may be executed by a general-purpose computer, e.g., a server computer or personal computer. Furthermore, aspects of the system can be embodied in a special purpose computer or data processor that is specifically programmed, configured, or constructed to perform one or more of the computer-executable instructions explained in detail herein. Such methods may also be performed by logic circuits which may be hard configured or configurable (such as, for example logic circuits provided by a field-programmable gate array "FPGA").

Software and other modules may reside on servers, workstations, personal computers, tablet computers, PDAs, color-grading tools, video projectors, audio-visual receivers, displays (including televisions), digital cinema projectors, media players, and other devices suitable for the purposes described herein. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures (e.g., containers) described herein may comprise computer files, variables, programming arrays, programming structures, or any electronic information storage schemes or methods, or any combinations thereof, suitable for the purposes described herein.

The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, hardwired or preprogrammed chips (e.g., EEPROM semiconductor chips), nanotechnology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Where a component (e.g. a gamut transformation block, transformation, inverse transformation, software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The technology provided herein can be applied to systems other than the example systems described above. The elements and acts of the various examples described above can be combined to provide further examples. Aspects of the system can be modified, if necessary, to employ the systems, functions, and concepts of the various references described above to provide yet further examples of the technology.

These and other changes can be made to the system in light of the above Detailed Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly and restrictively defines such terms. Accordingly, the actual scope of the system encompasses not only the disclosed examples, but also all equivalent ways of practicing or implementing the technology under the claims.

From the foregoing, it will be appreciated that specific examples of systems and methods have been described herein for purposes of illustration, but that various modifications may be made without deviating from the spirit and scope of the invention. Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations, modifications, additions and permutations are possible in the practice of this invention without departing from the spirit or scope thereof. The embodiments described herein are only examples. Other example embodiments may be obtained, without limitation, by combining features of the disclosed embodiments. It is therefore intended that the following appended claims and claims hereafter introduced are interpreted to include all such useful alterations, modifications, permutations, additions, combinations and sub-combinations.

What is claimed is:

1. An image decoder comprising:
a motion compensation stage;
a gamut transformation unit upstream from the motion compensation stage, the gamut transformation unit configured to modify pixel values in image data being decoded;
a frequency domain to spatial domain converter, wherein the gamut transformation unit is configured to modify pixel values in regions outputted by the frequency domain to spatial domain converter; and
first and second parallel decoding pipelines upstream from the motion compensation stage wherein the gamut transformation unit is configured to modify values in regions in the second decoding pipeline,
wherein the second decoding pipeline is connected to decode a difference signal representing a difference between a first video signal processed by the first decoding pipeline and a second video signal and the image decoder comprises a combining stage configured to receive and combine the difference signal and the first video signal to yield the second video signal.

2. An image decoder according to claim 1 wherein the frequency domain to spatial domain converter comprises an inverse DCT or an inverse DWT.

3. An image decoder according to claim 1 comprising an inverse quantization stage upstream from the frequency domain to spatial domain converter wherein the gamut transformation unit is connected to receive data output by the inverse quantization stage and is configured to control a gamut transformation based at least in part on values for DC frequency coefficients included in the data output by the inverse quantization stage.

4. An image decoder according to claim 1 comprising an inverse quantization stage and a frequency domain to spatial domain converter upstream from the motion compensation stage wherein the gamut transformation unit is connected to receive frequency domain data output by the inverse quantization stage and is configured to modify values in the frequency domain data output by the inverse quantization stage.

5. An image decoder according to claim 1 comprising first and second parallel decoding pipelines upstream from the motion compensation stage wherein the gamut transformation unit is configured to interpolate between or extrapolate from values in corresponding regions respectively output by the first and second parallel decoding pipelines.

6. An image decoder according to claim 5 wherein the regions are frequency-domain regions.

7. An image decoder according to claim 5 wherein the regions are spatial-domain regions.

8. A method for decoding images comprising:
processing an encoded signal to yield regions;
processing the regions for motion compensation to yield output image data;
upstream from processing the regions for motion compensation, modifying pixel values in the regions; and
processing first and second data in first and second parallel decoding pipelines upstream from the motion compensation stage wherein modifying pixel values in the regions comprises modifying values in regions in the second decoding pipeline,
wherein processing the encoded signal comprises performing a frequency domain to spatial domain transformation,
wherein modifying the pixel values is performed in the spatial domain, and
wherein the second decoding pipeline is connected to decode a difference signal representing a difference between a first video signal processed by the first decoding pipeline and a second video signal and the method comprises combining the difference signal and the first video signal to yield the second video signal.

9. A method according to claim 8 wherein performing the frequency domain to spatial domain conversion comprises performing an inverse DCT or an inverse DWT.

10. A method according to claim 8 comprising performing an inverse quantization operation upstream from performing the frequency domain to spatial domain transformation wherein modifying the pixel values in the regions is performed based at least in part on values for DC frequency coefficients included in the data yielded by the inverse quantization operation.

11. A method according to claim 8 comprising performing an inverse quantization operation and a frequency domain to spatial domain transformation upstream from the motion compensation wherein modifying pixel values in the regions comprises modifying values in frequency domain regions.

12. A method according to claim 8 comprising processing first and second data in parallel decoding pipelines upstream from processing the regions for motion compensation wherein modifying pixel values in the regions comprises interpolating between or extrapolating from values in corresponding regions respectively output by the first and second parallel decoding pipelines.

13. A method according to claim 12 wherein the regions are frequency-domain regions.

14. A method according to claim 12 wherein the regions are spatial-domain regions.

* * * * *